(12) United States Patent
Lee et al.

(10) Patent No.: US 7,949,158 B2
(45) Date of Patent: May 24, 2011

(54) METHOD AND APPARATUS FOR EXTRACTING FACE FEATURE

(75) Inventors: Yongjin Lee, Ansan (KR); Ki Young Moon, Daejeon (KR); Kyo Il Chung, Daejeon (KR)

(73) Assignee: Electronics and Communications Research Institute, Daejeon (KR)

( * ) Notice: Subject to any disclaimer, the term of this patent is extended or adjusted under 35 U.S.C. 154(b) by 970 days.

(21) Appl. No.: 11/828,651

(22) Filed: Jul. 26, 2007

(65) Prior Publication Data

US 2008/0130962 A1   Jun. 5, 2008

(30) Foreign Application Priority Data

Dec. 5, 2006   (KR) ........................ 10-2006-0122616

(51) Int. Cl.
*G06K 9/00* (2006.01)
(52) U.S. Cl. ........................................ 382/118
(58) Field of Classification Search ................... 382/118
See application file for complete search history.

(56) References Cited

U.S. PATENT DOCUMENTS

| | | | |
|---|---|---|---|
| 6,345,109 B1 | 2/2002 | Souma et al. | |
| 6,556,196 B1 * | 4/2003 | Blanz et al. | 345/419 |
| 6,826,300 B2 | 11/2004 | Liu et al. | |
| 7,054,468 B2 | 5/2006 | Yang | |
| 2004/0015495 A1 * | 1/2004 | Kim et al. | 707/3 |
| 2004/0218070 A1 * | 11/2004 | Hamalainen | 348/239 |
| 2004/0240711 A1 * | 12/2004 | Hamza et al. | 382/118 |
| 2008/0123907 A1 * | 5/2008 | Eura et al. | 382/118 |

FOREIGN PATENT DOCUMENTS

| | | | |
|---|---|---|---|
| EP | 1 388 804 | | 2/2004 |
| JP | 2006072540 A | * | 3/2006 |
| JP | 2006092491 A | * | 4/2006 |
| KR | 1020040034342 | | 4/2004 |
| KR | 1020050053130 | | 6/2005 |
| KR | 1020060104027 | | 10/2006 |
| KR | 1020060110707 | | 10/2006 |

OTHER PUBLICATIONS

Nhat et al., "An improvement on LDA algorithm for face recognition", Computer recognition systems, Advances in soft computing, 2005, vol. 30/2005, pp. 311-318.*
KIPO Notice of Patent Grant dated Mar. 21, 2008 for the corresponding application KR 10-2006-0122616.
Shaoning Pang et al. "Incremental Linear Discriminant Analysis for Classification of Data Streams." IEEE Transactions on Systems, Man, and Cybernetics—Part B: Cybernetics, vol. 35, No. 5, Oct. 2005.

* cited by examiner

*Primary Examiner* — Vu Le
*Assistant Examiner* — Soo Jin Park
(74) *Attorney, Agent, or Firm* — Ladas & Parry LLP

(57) ABSTRACT

A method and apparatus for extracting a face feature to construct a face search system having a high recognition rate are provided. The method includes calculating an average image of each of a plurality of candidates having one or more face images to which different weights are given according to an order in which the face images are acquired and calculating a total average image of all face images of the plurality of candidates, calculating a between-class scatter matrix based on a difference between each candidate's average image and the total average image and a within-class scatter matrix based on a difference between each candidate's average image and each candidate's predetermined face image of the one or more face images, and generating a base vector that maximizes a criterion defined by a ratio between the between-class scatter matrix and the within-class scatter matrix.

14 Claims, 8 Drawing Sheets

METHOD AND APPARATUS FOR EXTRACTING FACE FEATURE

CROSS-REFERENCE TO RELATED PATENT APPLICATIONS

This application claims the benefit of Korean Patent Application No. 10-2006-0122616, filed on Dec. 5, 2006, in the Korean Intellectual Property Office, the disclosure of which is incorporated herein in its entirety by reference.

BACKGROUND OF THE INVENTION

1. Field of the Invention

The present invention relates to a method and apparatus for extracting a face feature, and more particularly, to a method and apparatus for extracting a face feature, wherein a weight is set according to the order of acquiring images and a face feature is not affected by the number of image data of a candidate so that a face search system has a high recognition rate.

2. Description of the Related Art

A biometric system such as face recognition performs authentication and identification according to a type of service. In authentication, the identity of a user is confirmed using a one-to-one comparison method. In identification, the identity of a most similar person to a predetermined person is confirmed using a one-to-many biometric data comparison for a plurality of persons registered in a database. That is, in authentication, a binary class (or two class) result value is generated as yes or no, whereas in identification, a list of candidates is generated in the order of the decreasing probability as a result value.

Face recognition methods may be divided into methods based on two-dimensional (2D) photographs and methods based on three-dimensional (3D) modeling. The methods based on 3D modeling are advantageous in that a high recognition rate and stable performance can be achieved in various environments, but are disadvantageous in that expensive equipment is required and a large amount of computation for recognition makes it difficult to recognize a face in real time. Meanwhile, although the methods based on 2D photographs are disadvantageous in that recognition performance is influenced a lot by illumination, the direction of a face, and the change in facial expression, they are advantageous in that fast recognition can be accomplished with inexpensive equipment. Accordingly, a method based on 2D photographs is preferred to a method based on 3D modeling for use in a search system.

Face feature extraction is most essential to a 2D face recognition system based on photographs. Since an original face photograph has high-dimensional data, when it is used in the 2D face recognition system as it is, system efficiency is decreased due to a large amount of computation. For this reason, the 2D face recognition system requires feature extraction, in which a face portion suitable for recognition is extracted from an original face image or the original face image is reconstructed into a format suitable for recognition.

For instance, when a black-and-white image having a size of 64×64 pixels is used in a face recognition system, 64×64=4,096-dimensional data is used. Although a 64×64 pixel image does not seem very big in present computer technology, 4,096-dimensional data is high-dimensional data in terms of data analysis and processing with respect to present computation performance. In addition, the original 4,096-dimensional data is not necessary to be used as it is since redundant information or unnecessary information (e.g., noise) exists in the pixels. Consequently, to construct an efficient recognition system, dimension reduction to express 4,096-dimensional image data in a low-dimensional data format or feature extraction is needed.

Cases of low-dimensional data or features that can be generated from a high-dimensional image or data are almost infinite. Accordingly, a predetermined standard is needed in order to generate and select significant low-dimensional data and optimized low-dimensional data is generated based on the predetermined standard. This standard for dimension reduction is referred to as a criterion. Different dimension reduction methods have different criterions. For example, principal component analysis (PCA), which is the most widely used dimension reduction method, has a variance of data as the criterion. In other words, the higher the variance of data is in a low-dimensional space, the better high-dimensional data is expressed in low dimensions. As another example, Fisher linear discriminant (FLD) or Linear discriminant analysis (LDA) uses as the criterion a ratio between a between-class scatter and a within-class scatter. In other words, high-dimensional data is rewritten as low-dimensional data so that the ratio between the two scatters is maximum in the low-dimensional.

Actual dimension reduction is accomplished by projecting high-dimensional data on a base vector, i.e., a projection vector. When high-dimensional data is applied to a criterion of the aforementioned current dimension reduction methods, a projection vector that maximizes or minimizes a value of the criterion is calculated. In order to obtain the projection vector, optimization is used. In many wide-spread dimension reduction methods, the projection vector can be easily obtained by solving an eigenvalue problem or a generalized eigenvalue problem. Accordingly, it can be concluded that a criterion itself defines a dimension reduction method.

The biggest problems of 2D-based face recognition, and particularly of LDA or FLD, are generalization and overfit. Recognition performance is satisfactory with respect to a person whose face image has been used during the generation of a base vector but is not satisfactory with respect to a person whose face image has not been used during the generation of the base vector. In addition, when many face images of different persons are used to generate the base vector, recognition performance is higher than in other cases. Also, since a human face changes little by little over time, when images as recent as possible are used in base vector generation and feature extraction and registration, satisfactory recognition performance can be expected.

SUMMARY OF THE INVENTION

The present invention provides a method and apparatus for extracting a face feature, in which a criterion is provided for face feature extraction suitable for face search, thereby effectively obtaining a base vector and a face feature based on the criterion and providing a high recognition rate.

The present invention also provides a method and apparatus for extracting a face feature with a small amount of data by generating a new statistic value, a base vector, and a face feature using data of a new face image and an existing statistic value.

According to an aspect of the present invention, there is provided a method of extracting a face feature. The method includes: calculating an average image of each of a plurality of candidates having one or more face images to which different weights are given according to an order in which the face images are acquired and calculating a total average image of all face images of the plurality of candidates; calculating a between-class scatter matrix based on a difference between each candidate's average image and the total average image and a within-class scatter matrix based on a difference between each candidate's average image and each candidate's predetermined face image of the one or more face images; and generating a base vector that maximizes a criterion defined by a ratio between the between-class scatter matrix and the within-class scatter matrix.

According to another aspect of the present invention, there is provided an apparatus for extracting a face feature. The apparatus includes: an average image calculator calculating an average image of each of a plurality of candidates having one or more face images to which different weights are given according to an order in which the face images are acquired and calculating a total average image of all face images of the plurality of candidates; a scatter calculator calculating a between-class scatter matrix based on a difference between each candidate's average image and the total average image and a within-class scatter matrix based on a difference between each candidate's average image and each candidate's predetermined face image of the one or more face images; and a base vector generator generating a base vector that maximizes a criterion defined by a ratio between the between-class scatter matrix and the within-class scatter matrix.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
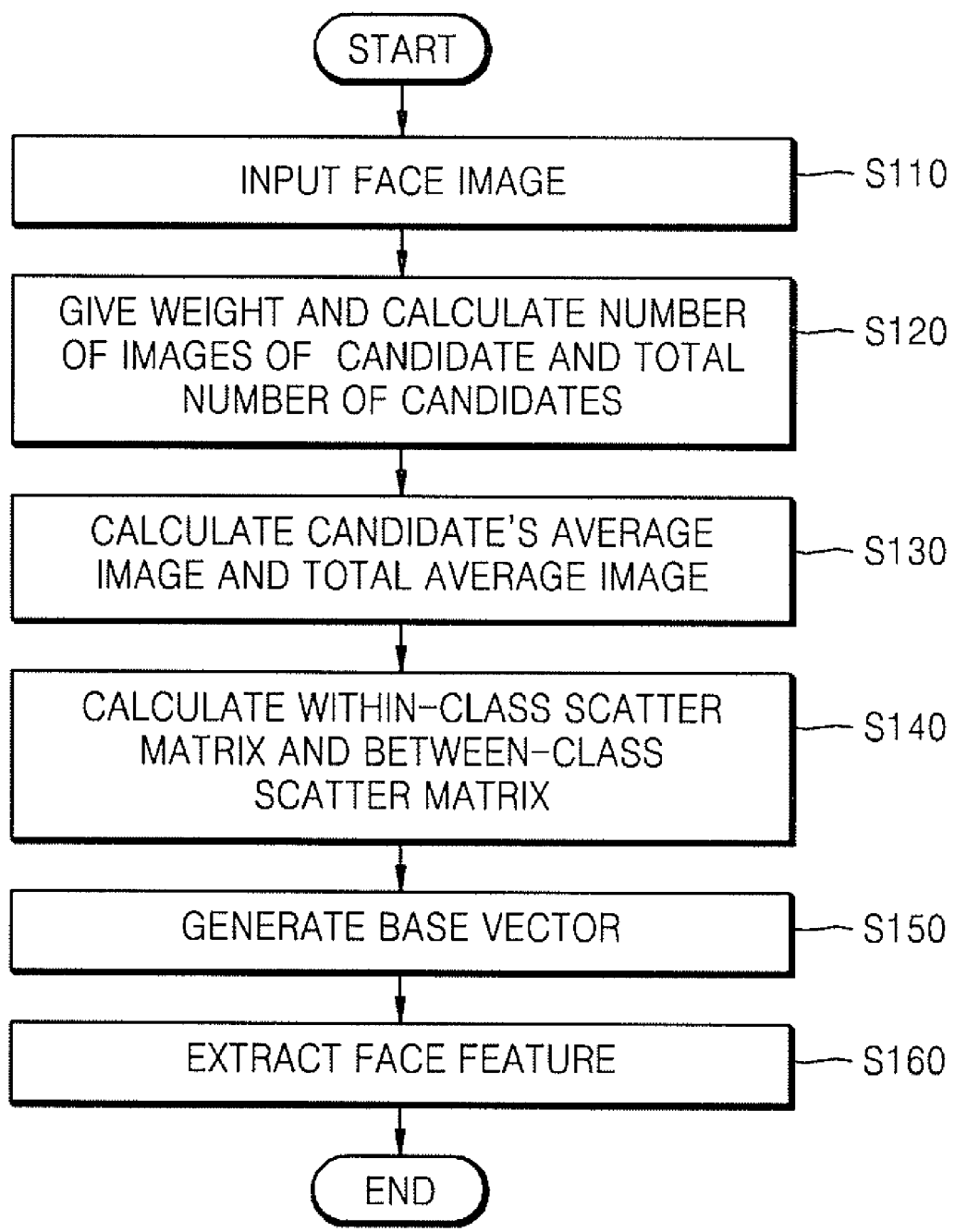
FIG. 1 is a flowchart of a method of extracting a face feature by giving a weight to a face image, according to an embodiment of the present invention.

Hereinafter, preferred embodiments of the present invention will be described in detail with reference to the attached drawings, in which like reference numerals denote like elements. When detailed description of related conventional functions or structures unnecessarily obscure the gist of the invention, the description will be omitted.

FIG. 1 is a flowchart of a method of extracting a face feature by giving a weight to a face image, according to an embodiment of the present invention. Referring to FIG. 1, when a face image is input in operation S110, a weight "α" is given to the face image according to an order in which the face image is acquired and the number of images of a candidate corresponding to the face image and the total number of candidates are calculated in operation S120. The weight "α" has a value of 0 through 1 and has a value close to 1 when the face image is an image acquired recently and a value close to 0 when the face image is an image acquired long ago. Accordingly, when more new face images are input, a weight to a face image obtained long ago gets closer to 0 and the influence of the face image obtained long ago gets smaller in generation of a base vector. When the face image is of a candidate that has not been registered, the total number of candidates increases by 1. When the face image is of a pre-registered candidate, the total number of candidates remains the same.

In operation S130, the candidate's average image and a total average image for the total candidates are calculated using the number of candidate images and the total number of candidates.

In operation S140, a within-class scatter matrix and a between-class scatter matrix are calculated using each candidate's average image and the total average image. The within-class scatter matrix is a scatter matrix made using a difference between a piece of image data of a candidate and average image data of the candidate. The between-class scatter matrix is a scatter matrix made using a difference between the average image data of the candidate and total average image data. The between-class scatter matrix is calculated without giving a weight based on the number of face images of each candidate and the within-class scatter matrix is calculated by normalizing the between-class scatter matrix using the number of face images of the candidate so that the scatters are not biased by the number of the candidate's face images, which may be different for each of the individual candidates.

In operation S150, a vector that maximizes a criterion defined by a ratio between the within-class scatter matrix and the between-class scatter matrix is generated as a base vector used to extract a face feature.

In operation S160, each candidate's average face image is projected on the base vector and a face feature of each candidate is extracted.

When another face image is input, a new base vector is generated using statistic values calculated in operations S120 through S150 and data of the newly input face image, that is, newly obtained average face image data of a current candidate, is projected on the new base vector, and a face feature of the current candidate is updated and extracted. For other candidates, existing average face image data of each candidate is projected on the new base vector and a face feature of the candidate is updated and extracted. When the input face image is not of a pre-registered candidate, the input face image is projected on the new base vector and a face feature is extracted and registered for a new candidate.

Hereinafter, a method of generating a criterion and a base vector, which are used to extract a face feature according to an embodiment of the present invention, will be described. Principal component analysis and linear discriminant analysis (LDA) or Fisher linear discriminant (FLD) are representative methods of extracting a face feature. It has been known that the LDA, which is a supervised learning method, provides a higher recognition rate than the principal component analysis, which is an unsupervised learning. The criterion of the LDA is defined by Equation (6) based on a between-class scatter matrix expressed by Equation (1) and a within-class scatter matrix expressed by Equation (4). Each candidate constructs a single class, which includes at least one face image of the candidate.

$$S_B = \sum_{i=1}^{c} n_i(m_i - m)(m_i - m)^T, \quad (1)$$

where "c" is the total number of candidates, $n_i$ is the number of face images of an i-th candidate, mi is an average face image (hereinafter, an average image) of the i-th candidate, and m is an average of all images of the total candidates, i.e., a total average face image (hereinafter, a total average image). Here, $m_i$ and m are defined by Equations (2) and (3), respectively:

$$m_i = \frac{1}{n_i} \sum_{s=1}^{n_i} x_{i,s}. \quad (2)$$

$$m = \frac{1}{n} \sum_{s=1}^{n} x_s = \frac{1}{n} \sum_{i=1}^{c} n_i m_i \quad (3)$$

where "x" is a vector made by connecting two-dimensional (2D) face photographs in a row or column, $x_s$ is an s-th image in all face images, and $x_{i,s}$ is an s-th face image of the i-th candidate.

$$S_W = \sum_{i=1}^{c} S_i \quad (4)$$

where $S_i$ is a within-class scatter of the i-th candidate and is defined by Equation (5).

$$S_i = \sum_{s=1}^{n_i} (x_{i,s} - m_i)(x_{i,s} - m_i)^T \quad (5)$$

$$J(w) = \frac{w^T S_B w}{w^T S_W w}. \quad (6)$$

Here, "w" is the base vector used to extract a face feature and is a vector maximizing a value of Equation (6). As expressed in Equation (7), a face feature "y" is obtained by projecting the face image "x" on the base vector "w":

$$y = w^T x. \quad (7)$$

Here, "w" can be obtained by solving a generalized eigenvalue problem obtained from Equation (6) and a plurality of values of "w" are selected according to an order of the magnitude of an eigenvalue. In other words, "y" also has a vector form. For clarity of the description, a vector having a biggest eigenvalue is represented as the base vector "w". The book "Pattern Classification (2nd Ed)," written by Richard O. Duda, Peter E. Hart, and David G. Stork and published by Wiely-Interscience, can be referred to for details about the LDA.

As shown in Equation (1), the between-class scatter matrix includes a difference between the average image of each class and the total average image and indicates how much face images between different persons are different from each other. Accordingly, when the between-class scatter matrix has a bigger value, recognition can be performed more easily. However, the number of face images of the i-th candidate, $n_i$, is given as a weight to the difference between the average face image of the i-th candidate, $m_i$, and the total average image "m". Accordingly, a feature value is biased to a candidate having more face images than other candidates. Similarly, with respect to the total average image "m" in Equation (3), the number of images of a candidate is given as a weight to an average image of each class.

Figure 2:
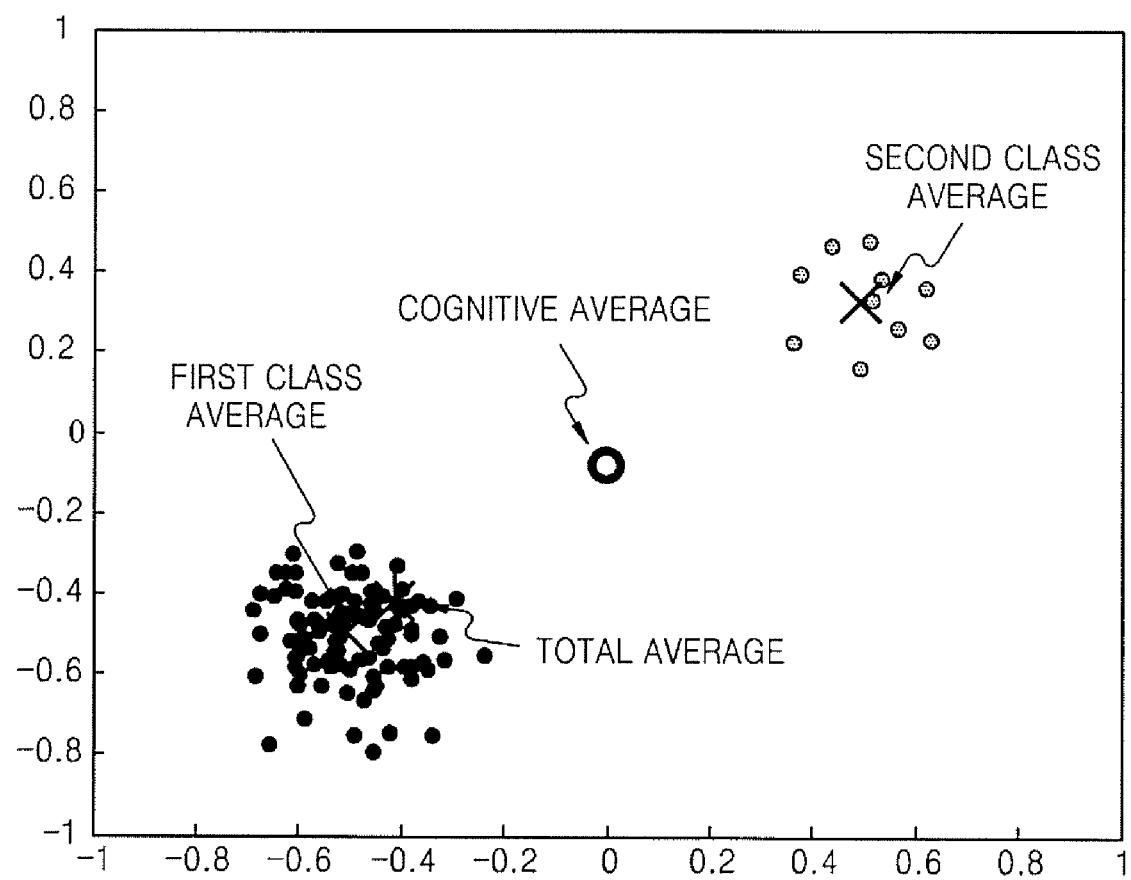
FIG. 2 is a graph for explaining how to calculate an average according to an embodiment of the present invention.

FIG. 2 is a graph for explaining how to calculate an average according to an embodiment of the present invention. FIG. 2 shows a case where when the number of data items in each class is different between classes, and a real average calculated from data is much different from an average cognitively expected, i.e., a cognitive average.

Referring to FIG. 2, an average of a first class is calculated from 100 data items and an average of a second class is calculated from 10 data items. In the drawing, a total average is calculated using Equation (3) and is close to the average of the first class. In other words, it can be inferred that the cognitive average is more appropriate than the total average in order to extract a feature with differences between classes scattered uniformly. As illustrated in FIG. 2, when newly acquired images of candidates are used in order to update a basis vector, a base vector is biased toward a candidate having a high use frequency. Accordingly, a criterion and a method for extracting a feature without being biased by the number of images of each candidate are required.

In the embodiments of the present invention, a between-class scatter matrix defined by Equation (8) obtained by modifying Equation (1) and a total average defined by Equation (9) obtained by modifying Equation (3) are used in order to extract feature that is not biased by the number of data items of each class. The cognitive average shown in FIG. 2 is calculated using Equation (9).

$$S_B = \sum_{i=1}^{c} (m_i - m)(m_i - m)^T \quad (8)$$

$$m = \frac{1}{c} \sum_{i=1}^{c} m_i \quad (9)$$

The within-class scatter matrix defined by Equation (4) is calculated by simply adding each within-class scatter defined by Equation (5) to indicate a cohesion in a class, and therefore, the within-class scatter matrix also may be biased to a class having many data items. To prevent such biasing, in the embodiments of the present invention, a within-class scatter of each class is calculated using Equation (10) which is normalized by the number of data items in the class.

$$S_i = \sum_{s=1}^{n_i} \frac{1}{n_i} (x_{i,s} - m_i)(x_{i,s} - m_i)^T \quad (10)$$

Since a human face changes little by little over time, a high success ratio can be expected when recognition is performed using a face feature extracted from a face image as recent as possible. Accordingly, when a bigger weight is given to a more recent image during feature extraction, recognition can be performed more effectively. A k-th candidate's average face image with a weight according to order of acquisition time can be defined by Equation (11).

$$m_k = \frac{1}{\lambda_k} \sum_{s=1}^{n_i} \alpha^{n_i - s} x_{k,s} \tag{11}$$

Here, $X_{k,s}$ is a face an image acquired s-th in time order among face images of the k-th candidate. In other words, $X_{k,nk}$ is the k-th candidate's face image acquired more recently. In Equation (11), $\alpha$ is a constant having a value of 0 to 1 and $\lambda_k$ is the number of face images of the k-th candidate, which is calculated in such a way that a weight is given to each face image according to an acquisition order of the face image. When $\alpha$ is 1, $\lambda_k$ is equal to $n_k$ indicating the number of face images that are really acquired and Equation (11) complies with the usual definition of an average and $\lambda_k$ is expressed by Equation (12).

$$\lambda_k = \sum_{i=1}^{n_k} \alpha^{n_k - i} \tag{12}$$

Accordingly, when the average face image of the k-th candidate is calculated using Equation (11), a bigger weight is given to a most recent face image. Since $\alpha$ has a value of 0 to 1, when more new face images are acquired, a weight of a face image acquired firstly gets closer to 0 and thus the face image acquired firstly hardly has the influence on the base vector generation.

The total average face image is calculated using Equation (13) based on Equations (11) and (12).

$$m = \frac{1}{c} \sum_{i=1}^{c} m_i \tag{13}$$

The between-class scatter matrix is calculated using Equation (14) based on Equations (11) and (13).

$$S_B = \sum_{i=1}^{c} (m_i - m)(m_i - m)^T \tag{14}$$

$$= \sum_{i=1}^{c} m_i m_i^T - c m m^T$$

A within-class scatter of a k-th class is calculated using Equation (15) based on Equation (11).

$$S_k = \frac{1}{\lambda_k} \sum_{s=1}^{n_k} \alpha^{n_i - s} (x_{k,s} - m_k)(x_{k,s} - m_k)^T \tag{15}$$

$$= \frac{1}{\lambda_k} \sum_{s=1}^{n_k} \alpha^{n_i - s} x_{k,s} x_{k,s}^T - m_k m_k^T$$

The within-class scatter matrix for all face images is calculated using Equation (16) based on Equation (15).

$$S_W = \sum_{i=1}^{c} S_i. \tag{16}$$

In order to update a base vector and update a feature using the updated base vector when a new face image and class information are given, Equations (12) through (16) need to be newly calculated. However, statistic values defined by Equations (12) through (16) are calculated from whole data. In other words, in order to calculate values reflecting new data, all of old data is also needed. In this case, all face images that has been input must be stored in a system in order to update statistic values, which is inefficient in terms of system management. To overcome this problem, the present invention provide a method of updating statistic values using only a new image and previous statistic values without using whole data.

The average face image of the k-th candidate can be updated using Equation (17):

$$\tilde{m}_k = \frac{1}{\tilde{\lambda}_k} \sum_{s=1}^{n_k+1} \alpha^{n_k + 1 - s} x_{k,s} \tag{17}$$

$$= \frac{1}{\tilde{\lambda}_k} \left( \sum_{s=1}^{n_k} \alpha^{n_k + 1 - s} x_{k,s} + x_{k,n_k+1} \right)$$

$$= \frac{1}{\tilde{\lambda}_k} \left( \alpha \sum_{s=1}^{n_k} \alpha^{n_k - s} x_{k,s} + x_{k,n_k+1} \right)$$

$$= \frac{\alpha \lambda_k}{\tilde{\lambda}_k} \frac{1}{\lambda_k} \sum_{s=1}^{n_k} \alpha^{n_k - s} x_{k,s} + \frac{1}{\tilde{\lambda}_k} x_{k,n_k+1}$$

$$= \frac{\alpha \lambda_k}{\tilde{\lambda}_k} m_k + \frac{1}{\tilde{\lambda}_k} x_{k,n_k+1}$$

$$= \frac{\tilde{\lambda}_k - 1}{\tilde{\lambda}_k} m_k + \frac{1}{\tilde{\lambda}_k} x_{k,n_k+1}$$

$$= m_k + \frac{1}{\tilde{\lambda}_k} (x_{k,n_k+1} - m_k)$$

where $x_{k,nk+1}$ is a newly acquired $n_{k+1}$-th image, $m_k$ is an average image calculated using the previous $n_k$ images and is defined by Equation (11), and $\tilde{m}_k$ is a new average image using $n_{k+1}$ images including the newly acquired image. As shown in Equation (17), the new average image $\tilde{m}_k$ can be calculated from the previous average image $m_k$ and the newly acquired image $x_{k,nk+1}$. Accordingly, when a new image is acquired, update of the average image of the k-th candidate can be efficiently performed without storing all images in the system. Here, $\tilde{\lambda}_k$ is defined by Equation (18).

$$\tilde{\lambda}_k = \alpha \lambda_k + 1 \tag{18}$$

The total average image is updated using Equations (19) and (20).

Equation (19) is for updating a total average when a new face image of a pre-registered candidate is acquired. According to Equation (19), a new total average face image is calculated using a newest average image of the k-th candidate based on the newly acquired image and a previous average image of the k-th candidate.

$$\tilde{m} = \frac{1}{c} \sum_{i=1}^{c} \tilde{m}_i \tag{19}$$

$$= \frac{1}{c} \sum_{i \neq k}^{c} m_i + \frac{1}{c} \tilde{m}_k$$

$$= \frac{1}{c} \sum_{i \neq k}^{c} m_i + \frac{1}{c} m_k - \frac{1}{c} m_k + \frac{1}{c} \tilde{m}_k$$

$$= m + \frac{1}{c}(\tilde{m}_k - m_k)$$

When a new candidate is registered and a face image of the new candidate is acquired, the total average image is updated using Equation (20):

$$\tilde{m} = \frac{1}{c+1} \sum_{i=1}^{c+1} \tilde{m}_i \qquad (20)$$

$$= \frac{1}{c+1} \sum_{i=1}^{c} m_i + \frac{1}{c+1} \tilde{m}_{c+1}$$

$$= \frac{c}{c+1} \frac{1}{c} \sum_{i=1}^{c} m_i + \frac{1}{c+1} \tilde{m}_{c+1}$$

$$= \frac{c}{c+1} m + \frac{1}{c+1} \tilde{m}_{c+1}$$

where $\tilde{m}_{c+1}$ is an average image of the new candidate. Since it is assumed that only face image of the (c+1)-th candidate is acquired, updated average images of respective first through c-th candidates are the same as previous average images thereof.

Equation (21) is obtained by combining Equations (19) and (20):

$$\tilde{m} = \frac{1}{\tilde{c}}(cm + \tilde{m}_k - m_k) \qquad (21)$$

$$= \frac{1}{\tilde{c}}\left[cm + \frac{1}{\lambda_k}(\tilde{x} - m_k)\right]$$

where $\tilde{x}$ is a newly acquired face image. Here, $\tilde{c}=c$ when the newly acquired face image is of a pre-registered candidate, and $\tilde{c}=c+1$ and $m_k=0$ when the newly acquired face image is of a newly registered candidate.

When a new image of a pre-registered candidate is acquired by the system, a new between-class scatter matrix is calculated using Equation (22). When a new image of a newly registered candidate is acquired by the system, a new between-class scatter matrix is calculated using Equation (23).

$$\tilde{S}_B = \sum_{i=1}^{c} \tilde{m}_i \tilde{m}_i^T - c\tilde{m}\tilde{m}^T \qquad (22)$$

$$= \sum_{i \neq k}^{c} m_i m_i^T + \tilde{m}_k \tilde{m}_k^T - c\tilde{m}\tilde{m}^T$$

$$= \sum_{i \neq k}^{c} m_i m_i^T + m_k m_k^T - cmm^T -$$

$$m_k m_k^T + cmm^T + \tilde{m}_k \tilde{m}_k^T - c\tilde{m}\tilde{m}^T$$

$$= S_B - m_k m_k^T + \tilde{m}_k \tilde{m}_k^T + cmm^T - c\tilde{m}\tilde{m}^T$$

$$\tilde{S}_B = \sum_{i=1}^{c+1} \tilde{m}_i \tilde{m}_i^T - (c+1)\tilde{m}\tilde{m}^T \qquad (23)$$

$$= \sum_{i=1}^{c} m_i m_i^T + \tilde{m}_{c+1} \tilde{m}_{c+1}^T - (c+1)\tilde{m}\tilde{m}^T$$

$$= \sum_{i=1}^{c} m_i m_i^T - cmm^T + cmm^T +$$

$$\tilde{m}_{c+1} \tilde{m}_{c+1}^T - (c+1)\tilde{m}\tilde{m}^T$$

$$= S_B + \tilde{m}_{c+1} \tilde{m}_{c+1}^T + cmm^T - (c+1)\tilde{m}\tilde{m}^T$$

Combination of Equations (22) and (23) produces Equation (24).

$$\tilde{S}_B = S_B - m_k m_k^T + \tilde{m}_k^T + cm\,m^T - \tilde{c}\tilde{m}\tilde{m}^T \qquad (24)$$

As described above, $\tilde{c}=c$ when the newly acquired face image is of a pre-registered candidate, and $\tilde{c}=c+1$ when the newly acquired face image is of a newly registered candidate.

The within-class scatter of the k-th candidate is calculated using Equation (25).

$$\tilde{S}_k = \frac{1}{\tilde{\lambda}_k} \sum_{s=1}^{n_k+1} \alpha^{n_k+1-s} x_{k,s} x_{k,s}^T - \tilde{m}_k \tilde{m}_k^T \qquad (25)$$

$$= \frac{1}{\tilde{\lambda}_k}\left(\alpha \sum_{s=1}^{n_k} \alpha^{n_k-s} x_{k,s} x_{k,s}^T + x_{k,n_k+1} x_{k,n_k+1}^T\right) - \tilde{m}_k \tilde{m}_k^T$$

$$= \frac{\alpha \lambda_k}{\tilde{\lambda}_k}\left(\frac{1}{\lambda_k} \sum_{s=1}^{n_k} \alpha^{n_k-s} x_{k,s} x_{k,s}^T - m_k m_k^T\right) +$$

$$\frac{1}{\tilde{\lambda}_k} x_{k,n_k+1} x_{k,n_k+1}^T + \frac{\alpha \lambda_k}{\tilde{\lambda}_k} m_k m_k^T - \tilde{m}_k \tilde{m}_k^T$$

$$= \frac{\tilde{\lambda}_k - 1}{\tilde{\lambda}_k} S_k + \frac{1}{\tilde{\lambda}_k} x_{k,n_k+1} x_{k,n_k+1}^T + \frac{\tilde{\lambda}_k - 1}{\tilde{\lambda}_k} m_k m_k^T - \tilde{m}_k \tilde{m}_k^T$$

$$= \frac{\tilde{\lambda}_k - 1}{\tilde{\lambda}_k} S_k + \frac{\tilde{\lambda}_k - 1}{\tilde{\lambda}_k \tilde{\lambda}_k}(m_k - \tilde{x})(m_k - \tilde{x})^T$$

$$= \frac{\tilde{\lambda}_k - 1}{\tilde{\lambda}_k}\left[S_k + \frac{1}{\tilde{\lambda}_k}(m_k - \tilde{x})(m_k - \tilde{x})^T\right]$$

When a new image of a pre-registered candidate is acquired by the system, a new within-class scatter matrix is calculated using Equation (26). When a new image of a newly registered candidate is acquired by the system, a new within-class scatter matrix is calculated using Equation (27).

$$\tilde{S}_W = \sum_{i=1}^{c} \tilde{S}_i \qquad (26)$$

$$= \sum_{i \neq k}^{c} S_i + \tilde{S}_k$$

$$= \sum_{i \neq k}^{c} S_i + S_k - S_k + \tilde{S}_k$$

$$= \sum_{i=1}^{c} S_i - S_k + \tilde{S}_k$$

$$= S_W - S_k + \tilde{S}_k$$

-continued $$\tilde{S}_W = \sum_{i=1}^{c+1} \tilde{S}_i \quad (27)$$
$$= \sum_{i=1}^{c} S_i + \tilde{S}_{c+1}$$
$$= S_W + \tilde{S}_{c+1}$$

Equation (28) is obtained by combining Equations (26) and (27). When update is performed based on the new image of the newly registered candidate, $S_k=0$.

$$\tilde{S}_W = S_W - S_k + \tilde{S}_k \quad (28)$$

Figure 3:
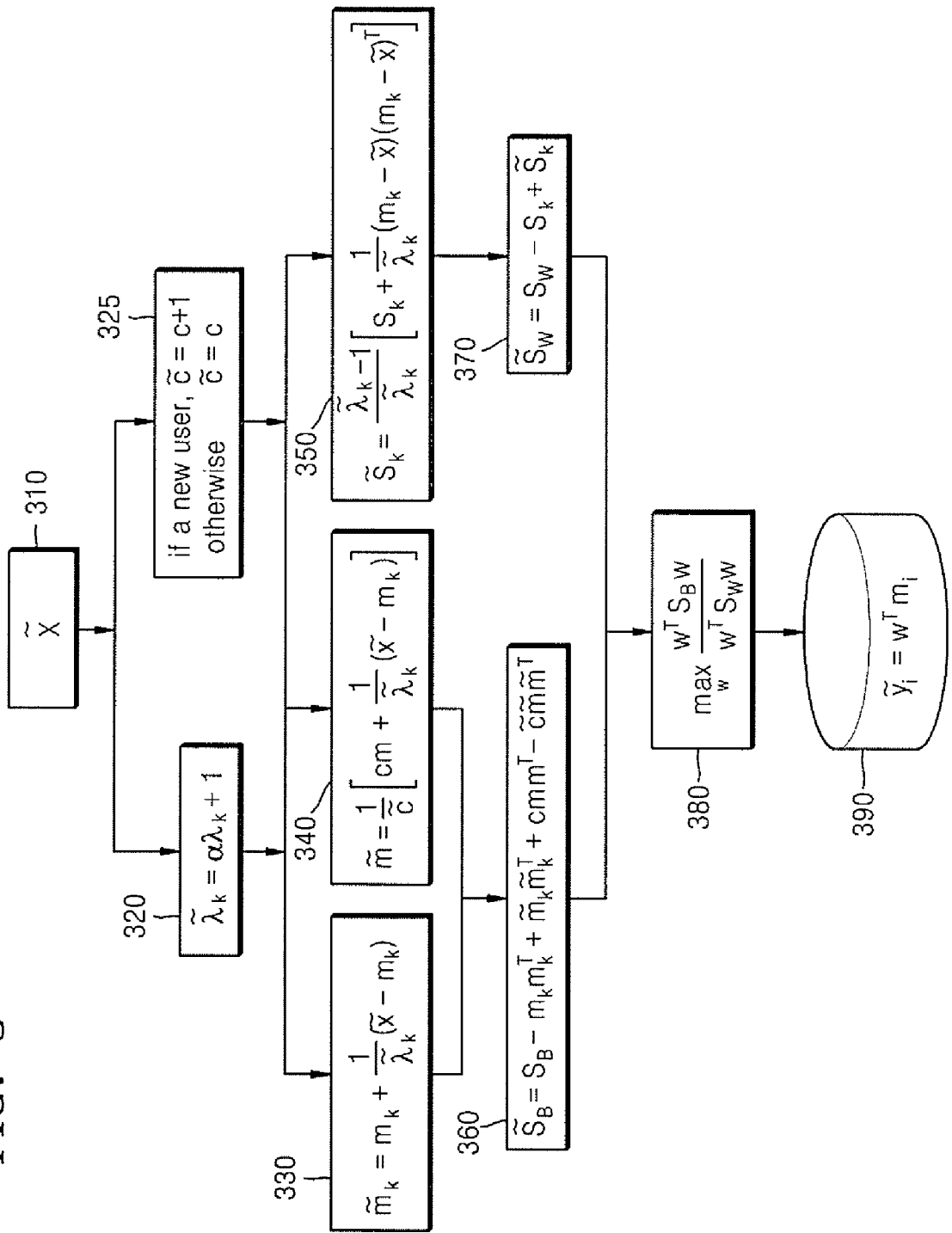
FIG. 3 illustrates equations and procedure for updating previous statistic values and a face feature, according to an embodiment of the present invention.

FIG. 3 illustrate equations and procedure for updating previous statistic values and a face feature calculated by the method illustrated in FIG. 1, according to an embodiment of the present invention. Referring to FIG. 3, $\tilde{x}$ is a newly acquired face image in stage 310. For clarity of the description, it is assumed that $\tilde{x}$ is an image of a k-th candidate. Next, the previous number of face images of the k-th candidate, which is calculated in such a way that a weight is given according to the acquisition order, is updated by giving a new weight in stage 320. The total number of candidates is updated in stage 325. If $\tilde{x}$ is an image of a pre-registered candidate, the total number of candidates does not change. However, when $\tilde{x}$ is the image of a newly registered candidate, the total number of candidates increases by 1. Next, the average image of the k-th candidate is updated in stage 330 and the total average image with respect to all candidates is also updated in stage 340. The within-class scatter of the k-th candidate, the between-class scatter matrix, and the within-class scatter matrix for all candidates are updated in stages 350, 360, and 370, respectively, using the statistic values obtained in the previous stages. The base vector "w" used to extract a face feature is calculated from the updated between-class scatter matrix and the updated within-class scatter matrix in stage 380. A new face feature reflecting the newly acquired face image is extracted for each of all candidates using the base vector "w" and the average image of each candidate in stage 390. Accordingly, a face feature of a candidate corresponding to the newly acquired face image is updated using a new average image of the candidate and a new base vector while a face feature of each of other candidates is updated using an existing old average image of each candidate and the new base vector.

Figure 4:
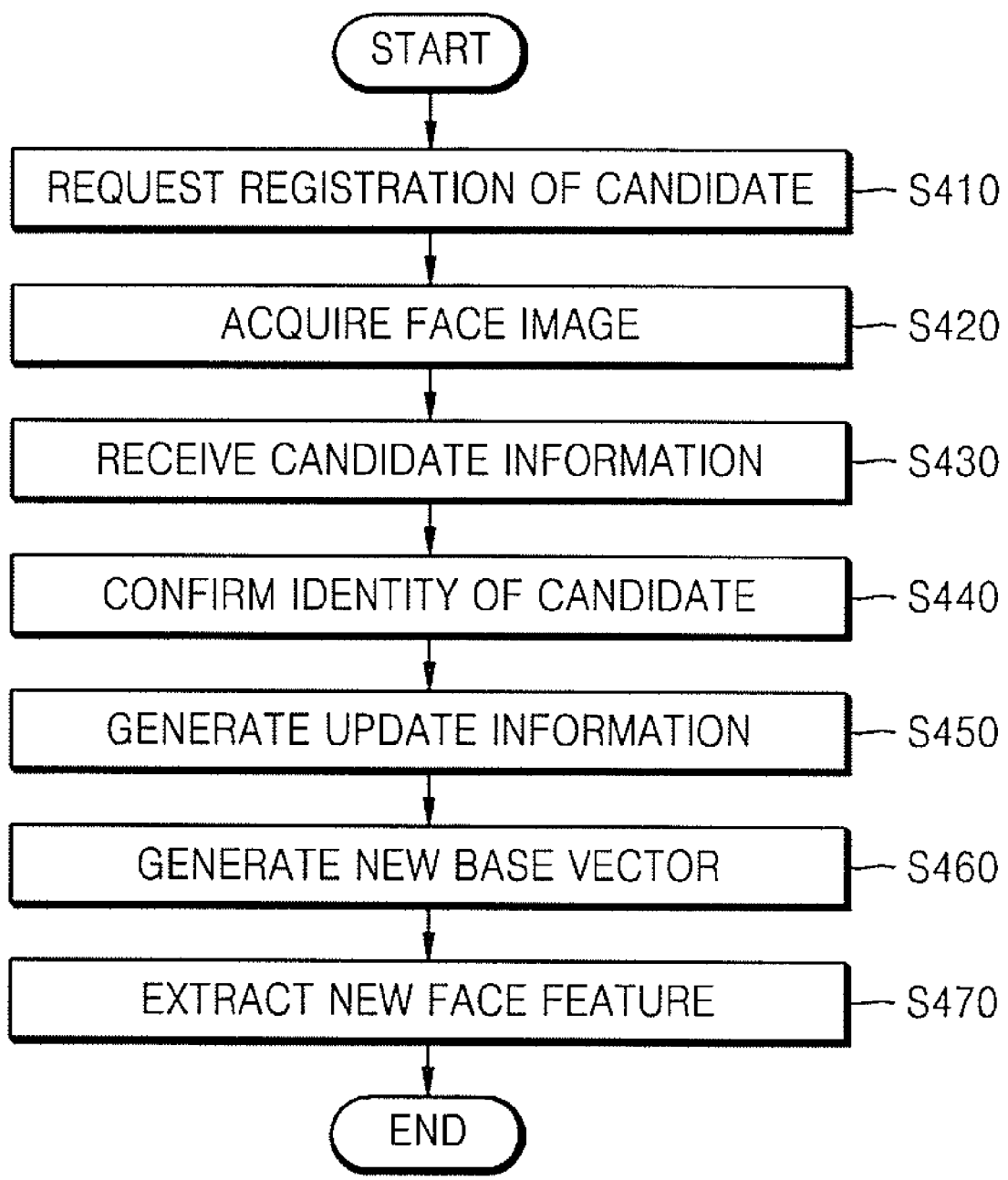
FIG. 4 is a flowchart of a procedure for registering a new candidate and updating a base vector and pre-registered candidates' face feature (i.e., a template) using image data of the new candidate.

FIG. 4 is a flowchart of a procedure for registering a new candidate and updating a base vector and a pre-registered candidate's face feature (i.e., template) using information on the new candidate, which is input during the registration. In operation S410, registration of a new candidate is requested. In operation S420, a face image of the new candidate is acquired using, for example, a camera. In operation S430, personal information on the new candidate other than the face image is registered. In operation S440, an operator finally confirms the registration.

In operation S450, information used to update a face feature of each of all registered candidates is generated using the input face image of the new candidate and the finally confirmed information on the new candidate. Here, the most important information is the face image of the new candidate and class information of the face image. An average face image of the new candidate and a total average face image are calculated based on the face image of the new candidate and are used to calculate a within-class scatter matrix and a between-class scatter matrix.

In operation S460, a new base vector is generated using the calculated scatter matrixes. In operation S470, using the new base vector, a face feature of the new candidate is generated and a face feature of each pre-registered candidate is updated.

Figure 5:
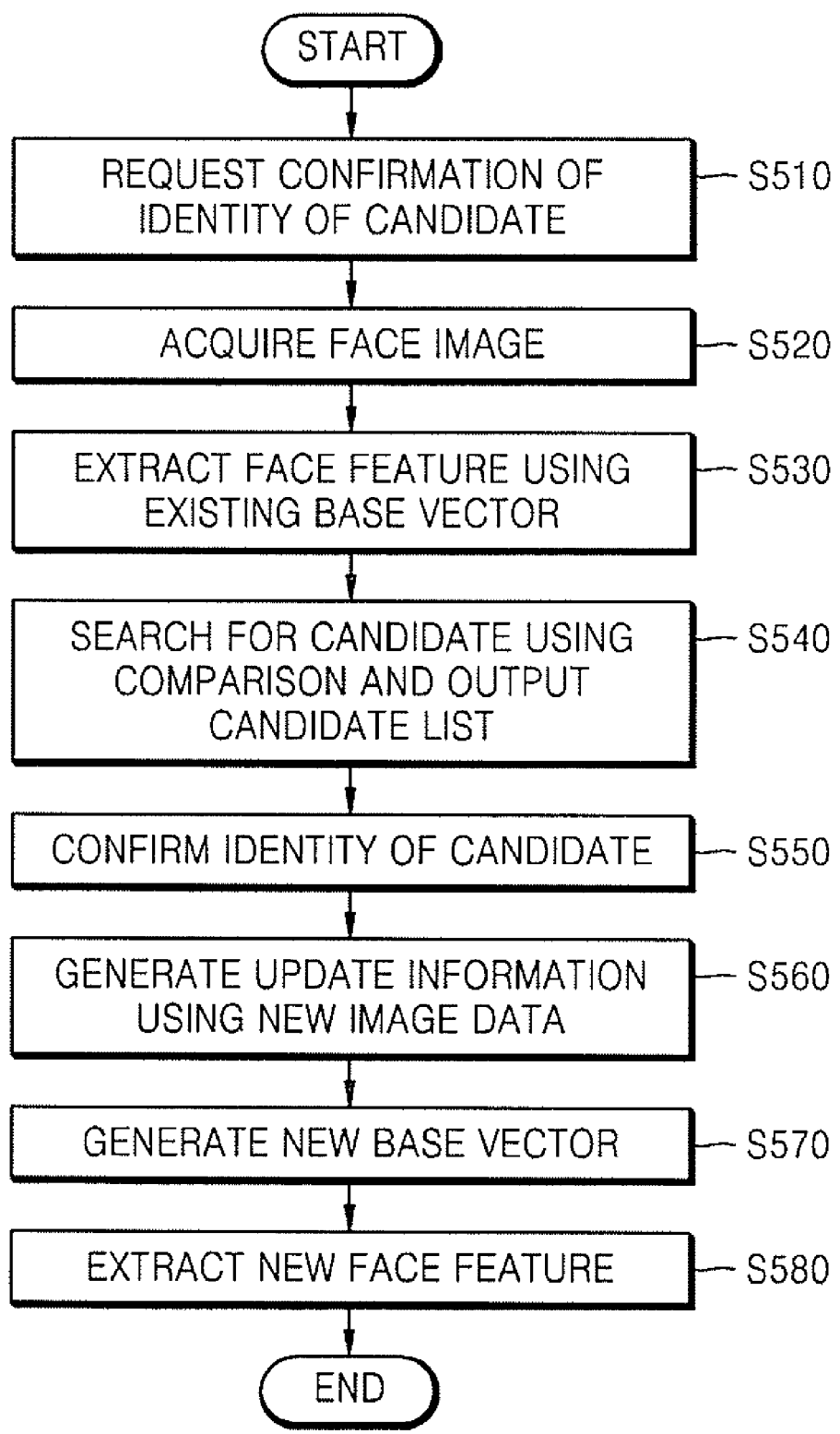
FIG. 5 is a flowchart of a procedure for searching for a candidate to confirm an identity and updating a base vector and pre-registered candidates' face feature using the candidate's image data input during the searching.

FIG. 5 is a flowchart of a procedure for searching for a candidate and updating a base vector and a pre-registered candidate's face feature using the candidate information input during the searching.

In operation S510, confirming of the identity of a candidate is requested. In operation S520, a face image of the candidate is acquired. In operation S530, a face feature of the candidate is extracted using an existing base vector. In operation S540, the candidate is searched for using a 1:N comparison, in which the face feature of the candidate to be searched for is compared with face features of N candidates registered in a database, and a candidate list for the searched candidate is output as a result of the searching. In operation S550, an operator compares the identity of the candidate with candidate information on the candidate list and confirms the identity of the candidate. Generally, during the searching, the candidate list including a plurality of candidates listed in order of decreasing probability is generated and confirming of the identity is completed by the operator selecting a candidate from the candidate list, who is decided by the operator to be most similar to the candidate whose identity is requested to be confirmed.

In operation S560, update information is generated using the face image of the candidate, which is acquired during the searching, and identity information confirmed by the operator. Here, the most important information is the acquired face image of the candidate and class information of the face image. The face image of the candidate whose identity has been confirmed is added to a corresponding class, and then an average face image of the candidate and a total average face image are calculated. A between-class scatter matrix is calculated based on a difference between the candidate's average face image and the total average face image. A within-class scatter matrix is calculated based on a difference between a face image of the candidate and the candidate's average face image.

In operation S570, a new base vector is generated using the above-calculated within-class scatter matrix and between-class scatter matrix. In operation S580, a face feature of the registered candidates is updated using the new base vector.

Figure 6:
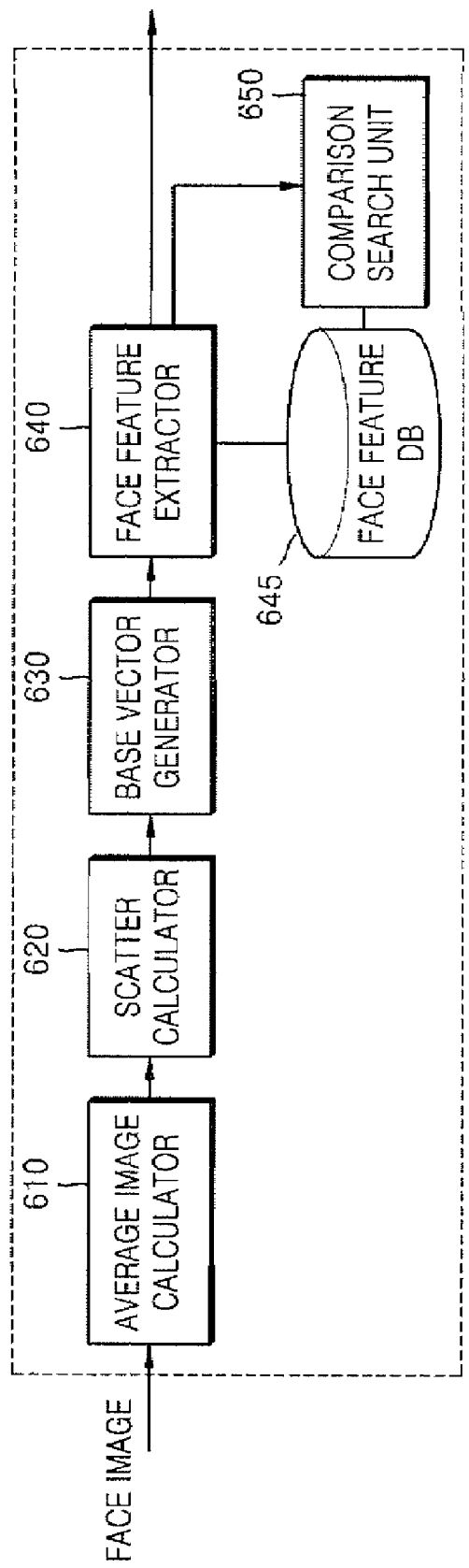
FIG. 6 is a block diagram of an apparatus for extracting a face feature according to an embodiment of the present invention.

FIG. 6 is a block diagram of an apparatus for extracting a face feature according to an embodiment of the present invention. The apparatus will be described in conjunction with FIGS. 1 to 6. The apparatus includes an average image calculator 610, a scatter calculator 620, a base vector generator 630, a face feature extractor 640, a face feature database (DB) 645, and a comparison search unit 650.

The average image calculator 610 calculates a candidate's average image and a total average image with respect to input face images. Since a human face changes little by little over time, when a face feature extracted from an image as recent as possible is used, a recognition rate is increased. Accordingly, a bigger weight is given to a more recent image when the candidate's average image and the total average image are calculated. The calculation is performed using Equations (11) through (13), where the weight "$\alpha$" has a value of 0 to 1.

When a new face image is input later, the candidate's average image and the total average image are updated using previous statistic value and data of the new face image. Calculation for the update is performed using Equations (17) through (21).

The scatter calculator 620 calculates a between-class scatter matrix and a within-class scatter matrix based on each candidate's average image and the total average image using Equations (14) through (16). Since the number of images of each candidate may be different and a scatter may be biased to a candidate having a large number of images, a weight according to the number of each candidate's images is not given when a between-class scatter is calculated and while normalization using the number of each candidate's images is performed when a within-class scatter is calculated.

When a new face image is input later, the between-class scatter matrix and the within-class scatter matrix are updated using a previous statistic value and data of the new face image. Calculation for the update is performed using Equations (22) through (28).

The base vector generator 630 generates a base vector that maximizes a criterion defined by a ratio between the between-class scatter matrix and the within-class scatter matrix. A plurality of base vectors may be generated. When a new face image is input later, a new base vector is generated using updated statistic values.

The face feature extractor 640 extracts a face feature of each candidate by projecting the candidate's average image on the new base vector. When the input face image is of a newly registered candidate, a face feature of the candidate is extracted by projecting data of the new face image on the new base vector and a face feature of each pre-registered candidate is updated by projecting the existing candidate's average image on the new base vector.

Extracted face features and updated face features are stored in the face feature DB 645.

The comparison search unit 650 compares a face feature extracted by projecting a face image, which is input for confirmation of the identity of a pre-registered candidate, on an existing base vector with a face feature of each candidate stored in the face feature DB 645 and outputs a candidate list as a result of the comparison.

Figure 7:
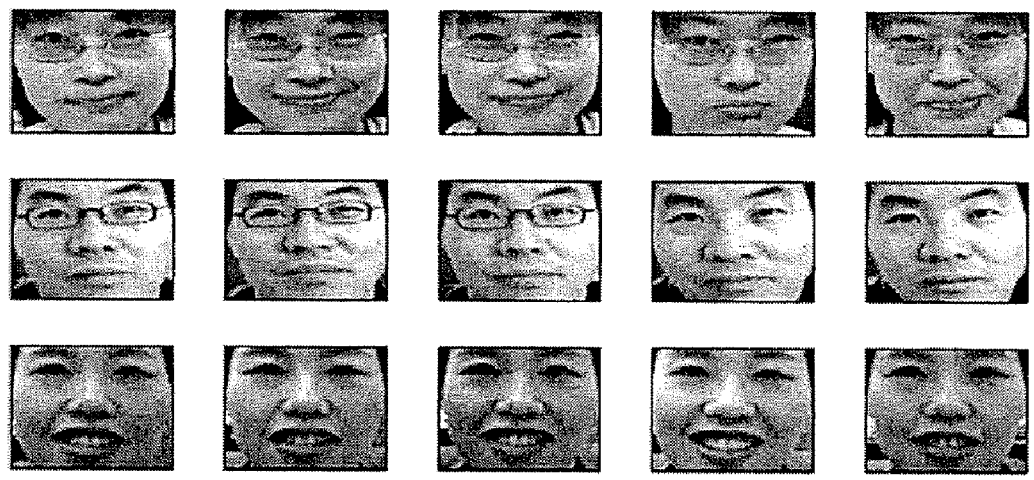
FIG. 7 illustrates examples of face images used in a method of extracting a face feature according to an embodiment of the present invention.

FIG. 7 illustrates examples of face images used to test the recognition rate of a method according to an embodiment of the present invention. In the test, 20 images for each of 55 persons (i.e., candidates), that is, 1100 images were used. The size of each image was 64×64 pixels. 5 images per person were used to calculate an average image of each person and a face feature of the person was extracted and registered based on the average image. The remaining 15 images per person were used to test the recognition rate.

Figure 8:
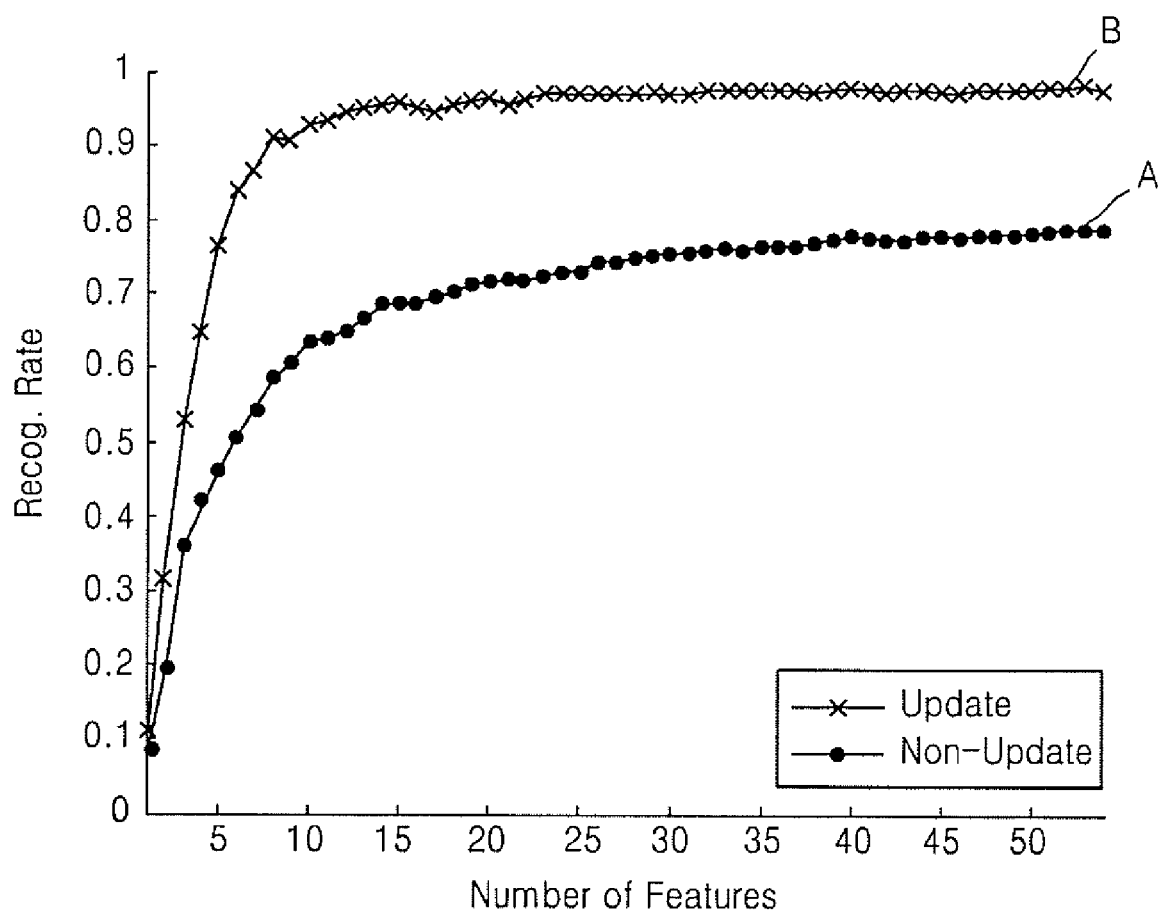
FIG. 8 is a graph showing the comparison between a face recognition rate obtained using conventional linear discriminant analysis (LDA) and a face recognition rate obtained using an embodiment of the present invention.

FIG. 8 is a graph showing the comparison between a face recognition rate obtained using the conventional LDA and a face recognition rate obtained using an embodiment of the present invention. The graph shows the change in the recognition rate with respect to the number of features. In both of the conventional LDA and the method according to the embodiment of the present invention, principal component analysis is used as pre-processing for efficient feature extraction, which is not specified in the present invention.

Referring to FIG. 8, line A indicates the recognition rate obtained using the conventional LDA while line B indicates the recognition rate obtained when a candidate's face feature is updated every time when an image of the candidate is acquired by using the method of the present invention.

Every time when a test is finished for a candidate, a newly acquired image is reflected to update a base vector and a face feature, which are used in a subsequent test and updated again. In the embodiment of the present invention, a most recent image of a candidate is continuously reflected, so that the recognition rate is effectively increased.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the present invention, a face feature is extracted and updated in such a way that data of a most recent face image is reflected and a weight is given according to an order in which a face image is acquired, so that a face recognition rate is increased. In addition, in order to prevent that the face feature is biased to a certain candidate because the numbers of face images are different between candidates according to how often a candidate uses a face recognition system, an equation for calculating a within-class scatter and an equation for calculating a between-class scatter are adjusted and a base vector is generated when the face feature is extracted. Accordingly, accurate face recognition can be accomplished. Furthermore, since new statistic values are obtained using existing statistic values and data of a new input image, it is not necessary to store data of all face images that has been input, thereby reducing system cost and facilitating system management.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of extracting a face feature, the method comprising:

calculating an average image of each of a plurality of candidates having two or more face images and calculating a total average image of all face images of the plurality of candidates, wherein a recent face image has a higher weight value than a least recent face image, wherein each of the two or more face images has weight value based on the order in which each the face images are acquired, wherein a most recent face image has a highest weight value and a most least recent face image has a lowest weight value, wherein the face images between the most recent face image and the most least face image are proportionally weighted between the highest weight value the lowest weight value according to an order, wherein the order is based on when the two or more face images were acquired, wherein the weight values for each of the two or more face images decease proportionally according to a new order when a new most recent face image is acquired;

calculating a between-class scatter matrix based on a difference between each candidate's average image and the total average image and a within-class scatter matrix based on a difference between each candidate's average image and each candidate's predetermined face image of the one or more face images; and generating a base vector that maximizes a criterion defined by a ratio between the between-class scatter matrix and the within-class scatter matrix, wherein the face image have a higher weight value has a greater influence on the generation of the base vector, wherein each of the face images have a less influence on the base vector changes each time a next new most recent face image is acquired.

2. The method of claim 1, further comprising extracting a face feature by projecting each candidate's average image on the base vector.

3. The method of claim 2, further comprising, when a face image of a new candidate other than the existing candidates is input, extracting a face feature used to register the new candidate by projecting the input face image on the base vector.

4. The method of claim 2, further comprising, when a face image of one candidate among the existing candidates is input:

extracting a face feature used to confirm the identity of the candidate by projecting the input face image on the base vector;

comparing the extracted face feature with face features of the existing candidates; and outputting a candidate list according to a result of the comparison.

5. The method of claim 3 or 4, further comprising updating previous statistic values which are values calculated in each step based on the previous statistic values and the input face image.

6. The method of claim 1, wherein the weight has a value of 0 to 1 and has a value close to 1 when the image is more recent.

7. The method of claim 1, wherein the calculating of the between-class scatter matrix and the within-class scatter matrix comprises calculating a between-class scatter without giving a weight according to the number of each candidate's face images to prevent the scatter from being biased by the number of the candidate's face images and calculating a within-class scatter using normalization using the number of the candidate's face images.

8. An apparatus for extracting a face feature, the apparatus comprising:

an average image calculator calculating an average image of each of a plurality of candidates having two or more face images and calculating a total average image of all face images of the plurality of candidates, wherein a recent face image has a higher weight value than a least recent face image, wherein each of the two or more face images has weight value based on the order in which each the face images are acquired, wherein a most recent face image has a highest weight value and a most least recent face image has a lowest weight value, wherein the face images between the most recent face image and the most least face image are proportionally weighted between the highest weight value the lowest weight value according to an order, wherein the order is based on when the two or more face images were acquired, wherein the weight values for each of the two or more face images decease proportionally according to a new order when a new most recent face image is acquired;

a scatter calculator calculating a between-class scatter matrix based on a difference between each candidate's average image and the total average image and a within-class scatter matrix based on a difference between each candidate's average image and each candidate's predetermined face image of the one or more face images; and a base vector generator generating a base vector that maximizes a criterion defined by a ratio between the between-class scatter matrix and the within-class scatter matrix, wherein the face image have a higher weight value has a greater influence on the generation of the base vector, wherein each of the face images have a less influence on the base vector changes each time a next new most recent face image is acquired.

9. The apparatus of claim 8, further comprising a face feature extractor extracting a face feature by projecting each candidate's average image on the base vector.

10. The apparatus of claim 9, wherein, when a face image of a new candidate other than the existing candidates is input, the face feature extractor extracts a face feature used to register the new candidate by projecting the input face image on the base vector.

11. The apparatus of claim 8, wherein the weight has a value of 0 to 1 and has a value close to 1 when the image is more recent.

12. The apparatus of claim 8, wherein the scatter calculator calculates a between-class scatter without giving a weight according to the number of each candidate's face images to prevent the scatter from being biased by the number of the candidate's face images and calculates a within-class scatter using normalization using the number of the candidate's face images.

13. The apparatus of claim 9, further comprising a comparison search unit comparing a face feature used to confirm the identity of one candidate among existing candidates with face features of the existing candidates when a face image of the candidate is input and outputting a candidate list according to a result of the comparison, wherein the face feature extractor extracts the face feature used to confirm the identity of the candidate by projecting the input face image on the base vector.

14. The apparatus of claim 10 or 13, wherein previous statistic values which are values calculated by each component of the apparatus are updated based on the previous statistic values and the input face image.

* * * * *